(12) United States Patent
Amano (10) Patent No.: US 9,561,693 B2
(45) Date of Patent: Feb. 7, 2017

(54) PNEUMATIC TIRE WITH TREAD HAVING CIRCUMFERENTIAL GROOVES

(75) Inventor: Masakazu Amano, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 106 days.

(21) Appl. No.: 13/394,500

(22) PCT Filed: Sep. 6, 2010

(86) PCT No.: PCT/JP2010/065261
§ 371 (c)(1),
(2), (4) Date: Mar. 6, 2012

(87) PCT Pub. No.: WO2011/027889
PCT Pub. Date: Mar. 10, 2011

(65) Prior Publication Data
US 2012/0160384 A1    Jun. 28, 2012

(30) Foreign Application Priority Data
Sep. 7, 2009   (JP) .................................. 2009-206059

(51) Int. Cl.
B60C 11/04    (2006.01)
B60C 11/13    (2006.01)

(52) U.S. Cl.
CPC .......... *B60C 11/1315* (2013.04); *B60C 11/042* (2013.04); *B60C 2011/0346* (2013.04); *B60C 2011/0355* (2013.04)

(58) Field of Classification Search
CPC .......... B60C 11/042; B60C 2011/0344; B60C 2011/0346; B60C 2011/0355
(Continued)

(56) References Cited

U.S. PATENT DOCUMENTS 2,843,172 A * 7/1958 Berry et al. ............. 152/209.21
4,456,046 A * 6/1984 Miller ..................... 152/209.18
(Continued)

FOREIGN PATENT DOCUMENTS

CA    1195599 A  * 10/1985
CN    1733512 A     2/2006
(Continued)

OTHER PUBLICATIONS

Machine translation for Japan 06-320914 (no date).*
(Continued)

*Primary Examiner* — Steven D Maki
(74) *Attorney, Agent, or Firm* — Sughrue Mion, PLLC (57) ABSTRACT

High wet braking performance is obtained without causing deterioration to other aspects of performance.
Circumferential direction grooves 14 are configured with first groove portions 16 of zigzag shape formed at the road surface side and second groove portions 18 of straight line shape formed at the groove bottom side. Accordingly, an effect (edge effect) is effectively exhibited by the edges of the first groove portions 16 catching on the road surface when running on a comparatively shallow water depth. High wet braking performance is accordingly obtained. Water in the grooves flows smoothly due to the presence of the second groove portions 18 at the groove bottom side when running on a comparatively deep water depth. Reliable ground contact performance of the tread surface of the tread 12 to the road surface and high wet braking performance is accordingly obtained. High wet braking performance can be secured irrespective of whether there is shallow or deep water due to the edge effect of the first groove portions 16 and due to the water expelling effect of the second groove portions 18.

2 Claims, 3 Drawing Sheets (58) Field of Classification Search
USPC .................................. 152/209.21, 900, 901
See application file for complete search history.

(56) References Cited

U.S. PATENT DOCUMENTS

| | | |
|---|---|---|
| 2003/0047262 A1 | 3/2003 | Kousaie et al. |
| 2006/0032567 A1 | 2/2006 | Oh |

FOREIGN PATENT DOCUMENTS

| | | | |
|---|---|---|---|
| DE | 3424796 A1 | * | 1/1985 |
| DE | 19507788 A1 | * | 9/1995 |
| EP | 0 520 755 A1 | | 12/1992 |
| FR | 2 534 858 A1 | | 4/1984 |
| JP | 59-77907 A | | 5/1984 |
| JP | 60-76404 A | | 4/1985 |
| JP | 61-175104 A | * | 8/1986 |
| JP | H01-215604 A | | 8/1989 |
| JP | 5-606 A | | 1/1993 |
| JP | 05-016616 A | * | 1/1993 |
| JP | H05-016616 A | | 1/1993 |
| JP | 06-320914 A | * | 11/1994 |
| JP | 08-091023 A | * | 4/1996 |
| JP | 8-276708 A | | 10/1996 |
| JP | 2006-51936 A | | 2/2006 |
| JP | 2007-314029 A | | 12/2007 |

OTHER PUBLICATIONS

Machine translation for Japan 08-091023 (no date).*
Machine translation for German 3,424,796 (no date).*
Machine translation for German 19507788 (no date).*
Machine translation for Japan 05-016616 (no date).*
Translation for Japan 61-175104 (no date).*
Machine translation for Japan 01-215604 (no date).*
Machine translation for Japan 60-076404 (no date).*
International Search Report for PCT/JP2010/065261 dated Dec. 7, 2010.
Extended European Search Report, dated Aug. 19, 2013, issued in corresponding European Patent Application No. 10813835.5.
Chinese Office Action, dated Sep. 9, 2013, issued in corresponding Chinese Patent Application No. 201080039631.4.
Communication from Japanese Patent Office issued Jan. 6, 2015 in counterpart Japanese Patent Application No. 2011-529972.

* cited by examiner

PNEUMATIC TIRE WITH TREAD HAVING CIRCUMFERENTIAL GROOVES

CROSS REFERENCE TO RELATED APPLICATIONS

This application is a National Stage of International Application No. PCT/JP2010/065261 filed Sep. 6, 2010, claiming priority based on Japanese Patent Application No. 2009-206059 filed Sep. 7, 2009, the contents of all of which are incorporated herein by reference in their entirety.

TECHNICAL FIELD

The present invention relates to a pneumatic tire and in particular to a pneumatic tire capable of raising wet braking performance.

BACKGROUND ART

Grooves are formed in the tread of a pneumatic tire for mounting to a vehicle to expel water between the tire and the road surface to outside of the ground contact surface when running on a wet road surface (see for example Japanese Patent Application Laid-Open (JP-A) No. 8-276708).

There are also demands to reduce the rolling resistance of pneumatic tires as part of a gathering momentum to raise fuel efficiency accompanying restrictions on exhaust gas emissions and rising oil prices.

DISCLOSURE OF INVENTION

Technical Problem

In order to realize a reduction in rolling resistance the type of rubber employed needs to be changed over to one with small rolling resistance, however such rubbers have characteristics that are detrimental to braking performance on a wet road surface. A tire is therefore desired that performs well in both aspects.

Conventional methods adopted to raise braking performance on a wet road surface include such methods as changing the groove depth in the tread, raising the negative ratio, and changing the groove placement. The problem is that such methods have a detrimental impact on performance in other areas, such as on wear and pass-by noise.

An object of the present invention is to provide a pneumatic tire that addresses all of the above issues and is capable of raising the wet braking performance without a detrimental impact on performance in other areas.

Solution to Problem

In the consideration of the above circumstances, a pneumatic tire of a first aspect of the present invention includes a tread formed with a circumferential direction groove extending along a tire circumferential direction, wherein the circumferential direction groove includes: a first groove portion formed at a tread road surface side so as to extend along the tire circumferential direction with an amplitude in a tire width direction; and a second groove portion formed at the groove bottom side of the first groove portion so as to extend in a straight line along the tire circumferential direction, and wherein a first groove portion groove depth A and a second groove portion groove depth B are set such that $A \leq B$.

Explanation follows regarding operation of the pneumatic tire according to the first aspect of the present invention.

Water between the tread and the road surface is expelled to outside of the tire ground contact surface through the circumferential direction grooves when the pneumatic tire of the first aspect runs on a wet road surface.

The first groove portions have, for example, a zigzag shape, and extend along the tire circumferential direction with amplitude in the tire width direction, so there is an edge component extending along the tire width direction.

Accordingly, an effect (edge effect) is effectively exhibited by the edges of the first groove portions (edge components in the tire width direction) catching on the road surface when running on a wet road surface of comparatively shallow water depth. High wet braking performance is accordingly obtained.

On the other hand, water in the grooves flows smoothly when running on a wet road surface of comparatively deep water depth, due to the presence of the second groove portions at the groove bottom side. Namely, the circumferential direction grooves are not grooves extending along the circumferential direction with a zigzag shape all the way from the road surface to the groove bottom, but are grooves with the second groove portions that extend in a straight line shape along the tire circumferential direction at the groove bottom side. Accordingly, there is less resistance to water flowing in the grooves than in normal conventional zigzag circumferential direction grooves that have a zigzag shape all the way from the road surface to the groove bottom. This enables water to be expelled efficiently, resulting in a tire with superior anti-hydroplaning performance. Reliable ground contact performance of the tread surface to the road surface and high wet braking performance is accordingly obtained due to efficiently expelling water between the tread surface and the road surface through the circumferential direction grooves to outside of the ground contact surface.

In this manner the pneumatic tire of the first aspect can obtain high wet braking performance irrespective of whether there is shallow or deep water due to the edge effect of the first groove portions and due to the water expelling effect of the second groove portions.

Since the second groove portion groove depth B is the first groove portion groove depth A or greater, sufficient water expelling effect can be exhibited with the circumferential direction grooves by the second groove portions extending along the tire circumferential direction, and the water expelling performance can be raised when there is a deep depth of water.

A pneumatic tire of a second aspect is the pneumatic tire of the first aspect, wherein three of the circumferential direction grooves are provided in the tread, and the groove width of the circumferential direction groove located at the center is set the same as or wider than the groove width of the circumferential direction grooves located at both sides.

Explanation follows regarding operation of a pneumatic tire according to the second aspect.

The tire width direction central side of the ground contact surface is a portion from which it is more difficult to expel water than at the shoulder sides, therefore preferably three circumferential direction grooves are formed in the tread, with the groove width of the circumferential direction groove disposed at the tread width direction center side set to be the groove width of the circumferential direction grooves at the two sides or greater. Accordingly, the water expelling performance at the tire width direction central side of the ground contact surface can be raised.

A pneumatic tire according to a third aspect is the pneumatic tire according to the second aspect, wherein the first groove portion groove width Z and the second groove portion groove width S are set such that the groove width ratio S/Z of the central circumferential direction groove is equal to or greater than the groove width ratio S/Z of the circumferential direction grooves located at both sides.

Explanation follows regarding operation of the pneumatic tire according to the third aspect.

By setting the groove width ratio S/Z of the central circumferential direction groove the same as or greater than the groove width ratio S/Z of the circumferential direction grooves at both sides, the volume of the second groove portion of the central circumferential direction groove is relatively the same as or greater than the volume of the second groove portion of the circumferential direction grooves at the two sides, enabling water expelling performance to be raised at the tire width direction central side from where it is difficult to remove water during ground contact.

Advantageous Effects of Invention

Due to the configuration of the pneumatic tire according to the first aspect as explained above, the excellent effect is exhibited of obtaining high wet braking performance without worsening other performance characteristics.

The problem with conventional methods, including such methods as making the groove depth deeper, raising the negative ratio, and changing the groove placement, is that such methods have a detrimental impact on performance in other areas, such as on wear and pass-by noise. However, the present invention is a configuration with a different groove shape at the tread face side to at the groove bottom side, and impact on other performance characteristics is suppressed while still raising the wet braking performance. Since there is sometimes a deterioration in braking performance on a wet road surface when the type of rubber of the tread is changed to one with low rolling resistance to achieve a reduction in the rolling resistance, by application of the present invention it is possible to suppress a reduction in wet braking performance when employing a rubber of low rolling resistance for the tread.

Furthermore, since in the pneumatic tire of the first aspect the first groove portion groove depth A and the second groove portion groove depth B are set with the relationship A≤B, water expelling performance can be raised when water depth is deep, enabling wet braking performance to be raised when there water depth is deep.

Due to configuring the pneumatic tire according to the second aspect as described above, improved wet braking performance can be achieved due to improving water expelling performance at the tire width direction central side.

Due to configuring the pneumatic tire according to the third aspect as described above, improved wet braking performance can be achieved due to improving water expelling performance at the tire width direction central side.

BEST MODE FOR CARRYING OUT THE INVENTION

Figure 1A:
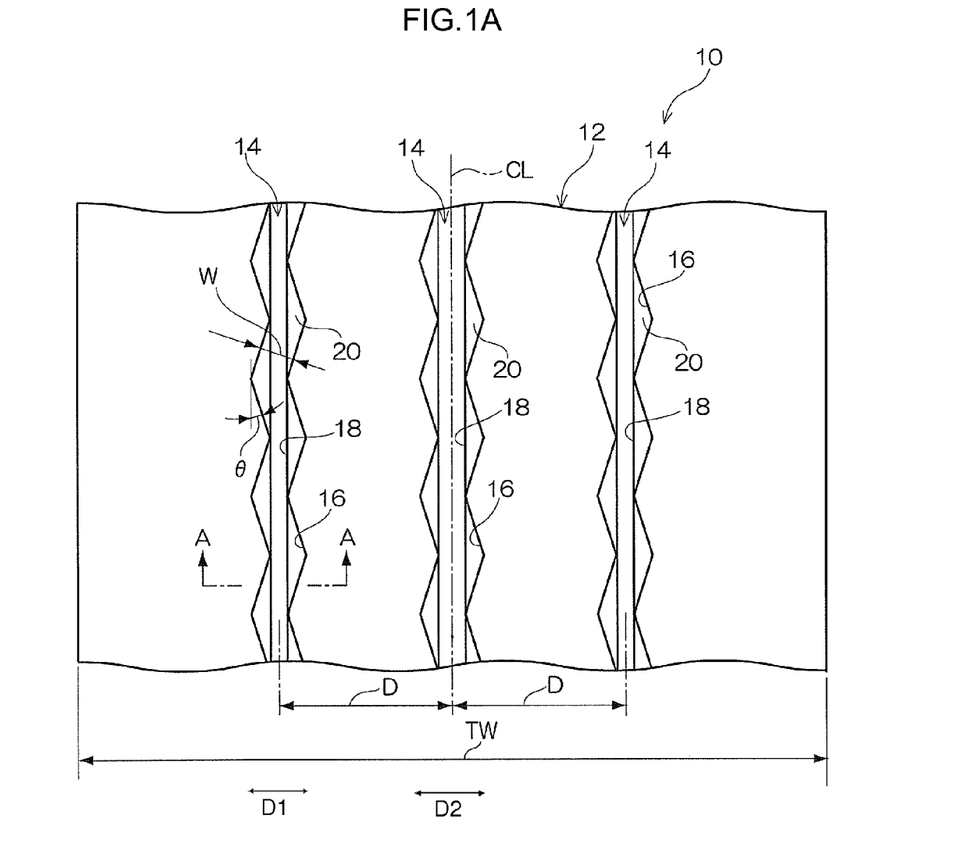
FIG. 1A is a plan view of a tread of a pneumatic tire according to an exemplary embodiment of the present invention.
Figure 1B:
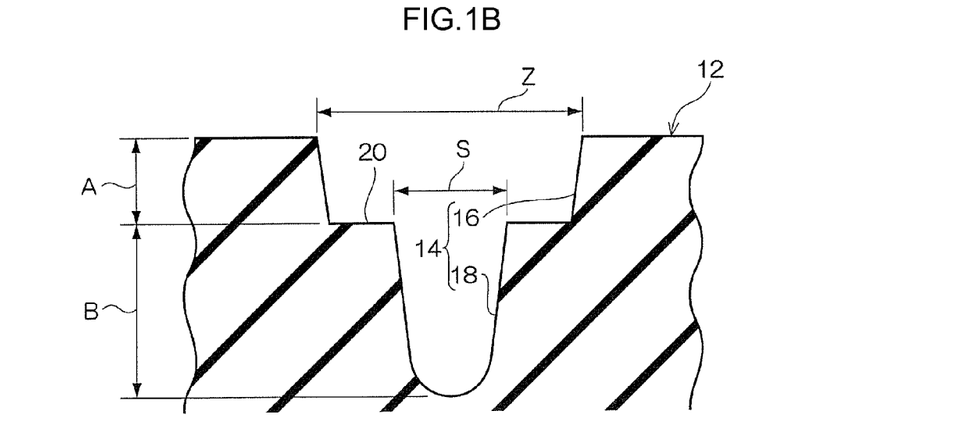
FIG. 1B is a cross-section of the tread illustrated in FIG. 1A, taken on line A-A.

Explanation follows regarding a pneumatic tire 10 according to an exemplary embodiment of the present invention, with reference to FIGS. 1A and 1B.

As shown in FIG. 1A and FIG. 1B, a tread 12 of the pneumatic tire 10 of the present exemplary embodiment is formed with three circumferential direction grooves 14 that extend continuously around the circumferential direction.

One of the circumferential grooves out of the three circumferential direction grooves 14 is disposed on a tire equatorial plane CL, and the other circumferential direction grooves 14 are disposed on either side of the tire equatorial plane CL.

Each of the circumferential direction grooves 14 of the present exemplary embodiment is configured with a first groove portion 16 that extends in a zigzag shape along the tire circumferential direction and is formed to the tread face side of the tread 12, and a second groove portion 18 that is formed at the groove bottom side and runs in a straight line along the tire circumferential direction.

Note that step portions 20 are formed at groove depth intermediate portions of the circumferential direction grooves 14, at the boundary portions of the second groove portion 18 and the first groove portion 16.

As shown in FIG. 1B, preferably the groove depth A of the first groove portion 16 and the groove depth B of the second groove portion 18 are set such that A≤B.

As shown in FIG. 1A, when forming the three (or three or more) circumferential direction grooves 14 in the tread 12 of the present exemplary embodiment, preferably the groove width Z (measurement of the opening portion along the tire width direction) of the circumferential direction groove 14 at the center side, is set to be the groove width Z of the circumferential direction grooves 14 at the two sides or greater.

As shown in FIG. 1B, the groove width Z (measurement of the opening portion along the tire width direction) of the first groove portion 16 and the groove width S (measurement of the opening portion along the tire width direction) of the second groove portion 18 are preferably set such that the groove width ratio S/Z at the circumferential direction groove 14 at the center is the same as or greater than the groove width ratio S/Z of the circumferential direction grooves 14 at the two sides.

Furthermore, when forming the three (or three or more) circumferential direction grooves 14 in the tread 12 of the present exemplary embodiment, preferably the following relationship is satisfied: groove width ratio S/Z of the circumferential direction groove 14 at the center side≥groove width ratio S/Z of the circumferential direction grooves 14 at the two sides.

Operation

Explanation follows regarding operation of the pneumatic tire 10 of the present exemplary embodiment.

The circumferential direction grooves 14 of the pneumatic tire 10 of the present exemplary embodiment are provided with the first groove portion 16 at the road surface side and the second groove portion 18 at the groove bottom side. Accordingly, an effect (edge effect) is effectively exhibited by the edges of the first groove portions 16 (the edge portions in the tire width direction) catching on the road surface when running on a wet road surface with comparatively shallow water depth. High wet braking performance is accordingly obtained.

On the other hand, water in the grooves flows smoothly due to the second groove portions 18 at the groove bottom side when running on a wet road surface with comparatively deep water depth. Reliable ground contact performance of the tread surface of the tread 12 to the road surface and high wet braking performance is accordingly obtained.

The pneumatic tire of the present exemplary embodiment can accordingly maintain high wet braking performance irrespective of whether there is shallow or deep water due to the edge effect of the first groove portions 16 and due to the water expelling effect of the second groove portions 18.

The water expelling performance can be raised for deep water depths by setting the groove depth B of the second groove portions 18 the same as or greater than the groove depth A of the first groove portions 16.

Note that since the zigzag shaped edges on the tire tread surface of the first groove portions 16 have the effect of raising braking performance there is no requirement to employ such a high groove volume, however A is preferably set low in order to increase edge pressure. For the second groove portions 18 however, a high groove volume is preferably employed to secure a pathway for expelling water through the groove to secure good anti-hydroplaning performance.

The tire width direction central side of the ground contact surface is a portion from which it is more difficult to expel water than at the shoulder sides. However, the water expelling performance can be raised at the tire width direction center side of the ground contact surface by forming three of the circumferential direction grooves 14 in the tread 12, and setting the groove width of the circumferential direction grooves 14 disposed at the tread width direction center side to be the groove width of the circumferential direction grooves 14 at the two sides or greater, as in the pneumatic tire 10 of the present exemplary embodiment.

Furthermore, by setting the groove width ratio S/Z in the circumferential direction groove 14 at the center side to be the same as or greater than the groove width ratio S/Z of the circumferential direction grooves 14 at the two sides, the relative volume of the second groove portion 18 at the circumferential direction groove 14 at the center side is made the same as or greater than the volume of the second groove portion 18 of the circumferential direction grooves 14 at the two sides. Water expelling performance can accordingly be raised at the tire width direction center side from which it is difficult to remove water when in contact with the ground.

Since the ground contact pressure is higher at the tire equatorial line CL of the tread 12 than at the shoulder side of the tread 12, a greater edge effect is obtained by making the amplitude D2 of the zigzag of the circumferential direction grooves 14 at the center side greater than the amplitude D1 of the circumferential direction grooves 14 at the two sides, than by making the amplitude of the zigzag of the circumferential direction grooves 14 at the two sides greater than the amplitude of the circumferential direction groove 14 at the center side.

The pneumatic tire 10 of the present exemplary embodiment is configured such that the groove profile of the circumferential direction grooves 14 is different at the tread face side to at the groove bottom side to raise the wet braking performance. Since conventional methods to raise wet braking performance are not employed, such as making the groove depth deeper, increasing the negative ratio, or changing the groove placement, impact is suppressed to other performance characteristics, such as to wear and pass-by noise.

Furthermore, although braking performance on a wet road surface deteriorates when a type of rubber with a low rolling resistance is employed for the tread in order to realize a reduction in the rolling resistance of the pneumatic tire 10, it is possible to suppress any fall in wet braking performance by employing the circumferential direction grooves 14 of the present exemplary embodiment.

While explanation has been given in the above exemplary embodiment of a case in which three of the circumferential direction grooves 14 are formed in the tread 12, the present invention is not limited thereto and two or four or more circumferential direction grooves 14 may be formed.

For cases in which four or more of the circumferential direction grooves 14 are formed, the circumferential direction grooves 14 nearest to the tire equatorial plane CL are preferably set with a groove width that is the same as or wider than the groove width of the circumferential direction grooves 14 furthest to the outside in the tire width direction. In such cases the groove width ratio S/Z of the circumferential direction grooves 14 nearest to the tire equatorial plane CL is preferably set the same as or greater than the groove width ratio S/Z of the circumferential direction grooves 14 furthest to the outside in the tire width direction.

In the above exemplary embodiments the first groove portions 16 extend in a zigzag shape along the tire circumferential direction, however configuration may be made with another shape, such as a sine wave shape, as long as the groove shape of the first groove portions 16 has at least an amplitude along the tire width direction.

Test 1

Figure 2A:
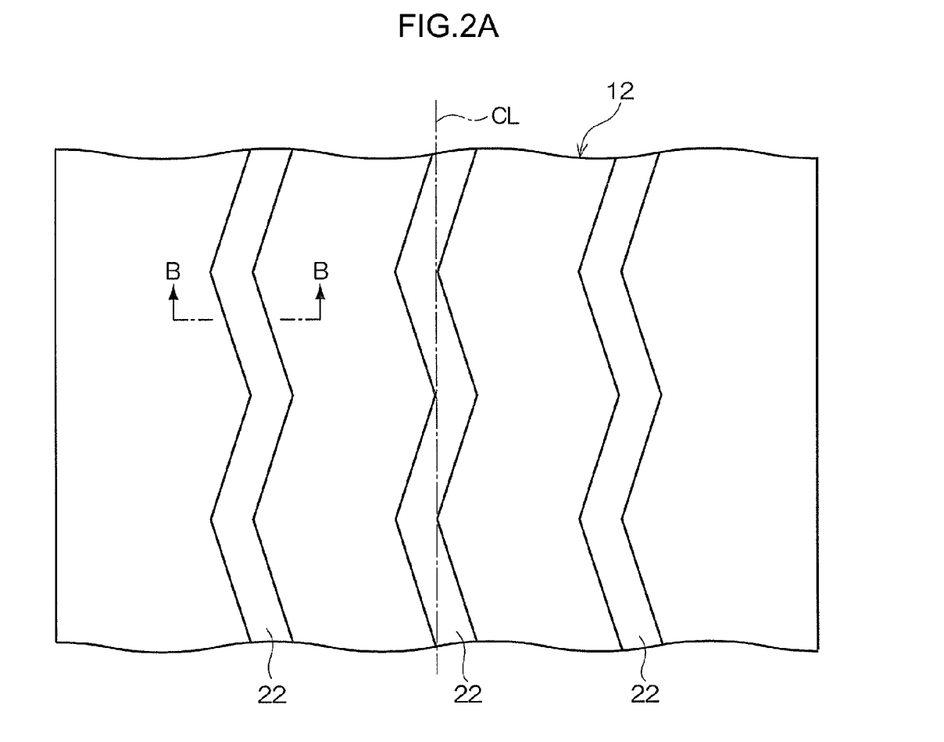
FIG. 2A is a plan view of a tread with conventional zigzag shaped circumferential direction grooves.
Figure 2B:
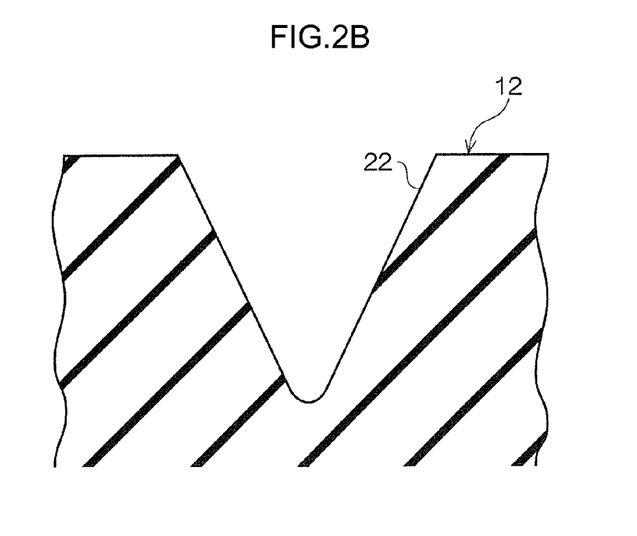
FIG. 2B is a cross-section of the tread illustrated in FIG. 2A, taken on line B-B.
Figure 3A:
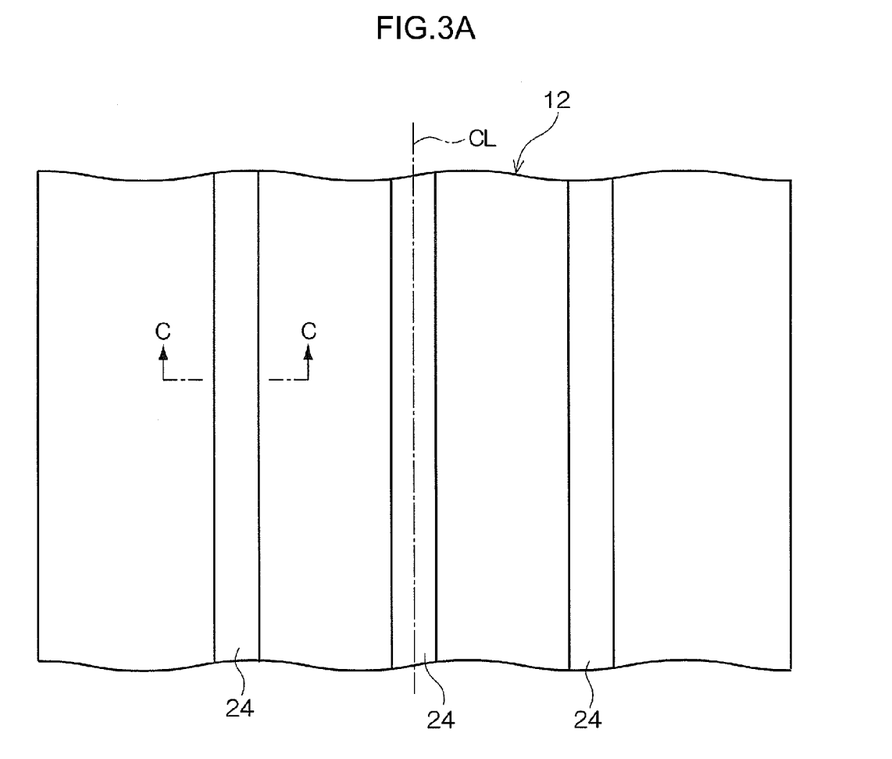
FIG. 3A is a plan view of a tread having conventional straight line shaped circumferential direction grooves.
Figure 3B:
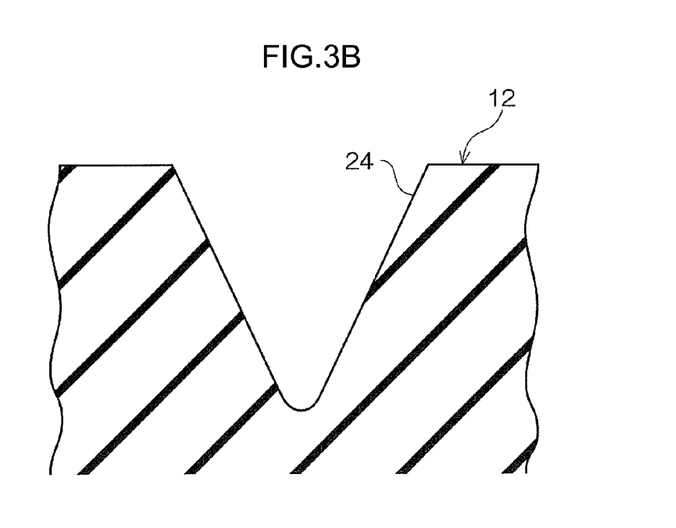
FIG. 3B is a cross-section of the tread illustrated in FIG. 3A, taken on line C-C.

In order to confirm the advantageous effect of the present invention the following tires are prepared, mounted to a test vehicle, and their braking performances and water expelling performances on a wet road surface are compared. The tires prepared are: one tire of a conventional example 1 with only zigzag shaped circumferential direction grooves 22 formed in the tread 12 as shown in FIG. 2; one tire of a conventional example 2 only provided with straight line shaped circumferential direction grooves 24 as shown in FIG. 3; and three types of Example Tire applied with the present invention.

The Example Tires are each provided with circumferential direction grooves in the tread provided with first groove portions and second groove portions as explained in the exemplary embodiment above.

The following dimensions of each portion of the tires are as set out in Table 1.

A: groove depth of the first groove portion of the circumferential direction groove (see FIG. 1B, units: mm)

B: groove depth of the second groove portion of the circumferential direction groove (see FIG. 1B, units: mm)

W: groove width of the circumferential direction groove (see FIG. 1A, measured in a perpendicular direction to the groove wall)

θ: oscillation angle of the groove with respect to the tire circumferential direction (units: °)

S: groove width of the second groove portion (see FIG. 1B, measured along the tire width direction, units: mm)

Z: groove width of the first groove portion (see FIG. 1B, measured along the tire width direction, units: mm)

TW: tread width (see FIG. 1A, measured along the tire width direction, units: mm)

D: separation between circumferential direction grooves (see FIG. 1A, measured along the tire width direction, units: mm)

Braking performance: speed of travel on wet road surface is 100 km/h. Braking distance (with ABS activated) on the wet road surface is measured, and evaluation values are shown as an index with the inverse of the braking distance for the conventional example 1 set at 100. The higher the value, the better the braking performance shown.

Water expelling performance (acceleration anti-hydroplaning performance): gradual acceleration is performed from running at 70 km/h on a 6 mm deep water covered road, with the speed when the tires start free-spinning taken as the hydroplaning generation speed. Evaluation is performed using an index with the hydroplaning generation speed of the conventional example 1 taken as 100. The higher the value, the higher the hydroplaning generation speed, and the better the water expelling performance shown.

The tire size is 195/80 R15, rim size is 15×6.0 J, internal pressure 450 kPa, and load is equivalent to two vehicle occupants.

TABLE 1

| | | Conventional Example 1 | Conventional Example 2 | Example 1 | Example 2 | Example 3 |
|---|---|---|---|---|---|---|
| Pattern Shape | | Zigzag Shape FIG. 2 | Straight Line Shape, FIG. 3 | Zigzag shape at road surface side and straight line shape at groove bottom side, FIG. 1 | | |
| Circumferential Direction Groove Depth | A | 9.0 | 0 | 3.0 | 3.0 | 3.0 |
| | B | 0 | 9.0 | 6.0 | 6.0 | 6.0 |
| Circumferential Direction Groove Width W | Center | 7.7 | 8.1 | 7.4 | 9.2 | 9.2 |
| | Two Sides | | | 7.7 | 7.1 | 7.1 |
| Groove Width S of Second Groove Portion | Center | 0 | 8.1 | 2.5 | 2.5 | 5.6 |
| | Two Sides | | | 4.0 | 3.2 | 3.2 |
| Groove Width Z of First Groove Portion | Center | 8.1 | 8.1 | 8.1 | 9.7 | 9.7 |
| | Two Sides | | | | 7.3 | 7.3 |
| Oscillation Angle θ | Center | 18 | 0 | 24 | 28 | 18 |
| | Two Sides | | | 18 | 18 | 18 |
| (S/Z) × 100 | Center | 0 | 100 | 31 | 26 | 58 |
| | Two Sides | 0 | 100 | 49 | 44 | 44 |
| Tread Width TW | | 155 | 155 | 155 | 155 | 155 |
| Circumferential Direction Groove Spacing D | | 36.4 | 36.4 | 36.4 | 36.4 | 36.4 |
| Braking Distance Index (values in brackets are water depth in mm) | (2.0) | 100 | 105 | 102 | 104 | 107 |
| | (1.4) | 100 | 109 | 102 | 104 | 111 |
| | (0.2) | 100 | 93 | 102 | 103 | 102 |
| Water Expelling Performance Index (Acceleration Hydroplane) | | 100 | 109 | 105 | 106 | 108 |

It can be seen from the test results that tires of the Examples applied with the present invention have high braking performance irrespective of whether the water depth is deep or the water depth is shallow. It can also be seen that the tires of the Examples applied with the present invention have sufficient water expelling performance.

Test 2

In order to confirm the advantageous effects of the present invention similar tests are performed to those of Test 1 with the groove depths A, B set as shown in the following Table 2.

TABLE 2

|  |  | Conventional Example 1 | Conventional Example 2 | Example 3 | Example 4 | Comparative Example 1 |
|---|---|---|---|---|---|---|
| Pattern Shape |  | Zigzag Shape FIG. 2 | Straight Line Shape, FIG. 3 | Zigzag shape at road surface side and straight line shape at groove bottom side, FIG. 1 | | |
| Circumferential Direction Groove Depth | A | 9.0 | 0 | 3.0 | 4.5 | 6.0 |
|  | B | 0 | 9.0 | 6.0 | 4.5 | 3.0 |
| Circumferential Direction Groove Width W | Center | 7.7 | 8.1 | 9.2 | 9.2 | 9.2 |
|  | Two Sides |  |  | 7.1 | 7.1 | 7.1 |
| Groove Width S of Second Groove Portion | Center | 0 | 8.1 | 5.6 | 5.6 | 5.6 |
|  | Two Sides |  |  | 3.2 | 3.2 | 3.2 |
| Groove Width Z of First Groove Portion | Center | 8.1 | 8.1 | 9.7 | 9.7 | 9.7 |
|  | Two Sides |  |  | 7.3 | 7.3 | 7.3 |
| Oscillation Angle θ | Center | 18 | 0 | 18 | 18 | 18 |
|  | Two Sides |  |  | 18 | 18 | 18 |
| (S/Z) × 100 | Center | 0 | 100 | 58 | 58 | 58 |
|  | Two Sides | 0 | 100 | 44 | 44 | 44 |
| Tread Width TW |  | 155 | 155 | 155 | 155 | 155 |
| Circumferential Direction Groove Spacing D |  | 36.4 | 36.4 | 36.4 | 36.4 | 36.4 |
| Water Expelling Performance Index (Acceleration Hydroplane) |  | 100 | 109 | 108 | 105 | 102 |
| Braking Distance Index (values in brackets are water depth in mm) | (2.0) | 100 | 105 | 107 | 104 | 101 |
|  | (0.2) | 100 | 93 | 102 | 101 | 100 |

It can be seen from the results that in the Example 3 in which A<B, and the Example 4 in which A=B, the braking performance and water expelling performance is superior to that of the Comparative Example where A>B, outside of the definition of the present invention.

Test 3

In order to confirm the advantageous effects of the present invention similar tests are performed to those of the Test 1 with the ratio of S and Z set as shown in the following Table 3.

It can be seen from the results that the water expelling performance rises as the proportion of S to Z increases, and there is a large contribution to braking distance from raising the water expelling performance at the tread center where water is not easily expelled.

EXPLANATION OF THE REFERENCE NUMERALS

10 PNEUMATIC TIRE
12 TREAD

TABLE 3

|  |  | Conventional Example 1 | Conventional Example 2 | Example 3 | Example 6 | Example 7 |
|---|---|---|---|---|---|---|
| Pattern Shape |  | Zigzag Shape FIG. 2 | Straight Line Shape, FIG. 3 | Zigzag shape at road surface side and straight line shape at groove bottom side, FIG. 1 | | |
| Circumferential Direction Groove Depth | A | 9.0 | 0 | 3.0 | 3.0 | 3.0 |
|  | B | 0 | 9.0 | 6.0 | 6.0 | 6.0 |
| Circumferential Direction Groove Width W | Center | 7.7 | 8.1 | 9.2 | 9.2 | 9.2 |
|  | Two Sides |  |  | 7.1 | 7.1 | 7.1 |
| Groove Width S of Second Groove Portion | Center | 0 | 8.1 | 5.6 | 4.9 | 4.3 |
|  | Two Sides |  |  | 3.2 | 3.7 | 4.2 |
| Groove Width Z of First Groove Portion | Center | 8.1 | 8.1 | 9.7 | 9.7 | 9.7 |
|  | Two Sides |  |  | 7.3 | 7.3 | 7.3 |
| Oscillation Angle θ | Center | 18 | 0 | 18 | 21 | 23 |
|  | Two Sides |  |  | 18 | 16 | 14 |
| (S/Z) × 100 | Center | 0 | 100 | 58 | 51 | 44 |
|  | Two Sides | 0 | 100 | 44 | 51 | 58 |
| Tread Width TW |  | 155 | 155 | 155 | 155 | 155 |
| Circumferential Direction Groove Spacing D |  | 36.4 | 36.4 | 36.4 | 36.4 | 36.4 |
| Water Expelling Performance Index (Acceleration Hydroplane) |  | 100 | 109 | 108 | 106 | 103 |
| Braking Distance Index (values in brackets are water depth in mm) | (2.0) | 100 | 105 | 107 | 105 | 102 |
|  | (0.2) | 100 | 93 | 102 | 102 | 102 |

14 CIRCUMFERENTIAL GROOVE
16 FIRST GROOVE PORTION
18 SECOND GROOVE PORTION

The invention claimed is:

1. A pneumatic tire comprising a tread having a tread surface and being formed with a circumferential direction groove extending along a tire circumferential direction, wherein the circumferential direction groove comprises:
a first groove portion formed at a tread road surface side so as to extend along the tire circumferential direction with an amplitude in a tire width direction; and
a second groove portion formed at the groove bottom side of the first groove portion so as to extend in a straight line along the tire circumferential direction, wherein a first groove portion groove depth A and a second groove portion groove depth B are set such that A≤B, and wherein a groove width of the second groove portion decreases in a tire radial inner direction continuously from a top of the second groove portion to a bottom of the second groove portion,
wherein three of the circumferential direction grooves are provided in the tread and are formed in a zigzag shape, and a central circumferential direction groove of the circumferential direction grooves located between the others of the circumferential direction grooves has a groove width of the second groove portion set wider than a groove width of the second groove portion of the others of the circumferential direction grooves,
wherein a groove width in the tire width direction of the first groove portion of the central circumferential direction groove is set greater than a groove width in the tire width direction of the first groove portion of the others of the circumferential direction grooves, while the groove width of the first groove portion minus the groove width of the second groove portion of the central circumferential direction groove is set to be equal to the groove width of the first groove portion minus the groove width of the second groove portion of the others of the circumferential direction grooves,
wherein step portions are formed at a groove depth intermediate portion of each of the circumferential direction grooves at a boundary portion of the first groove portion and the second groove portion, and
the step portions are substantially parallel to the tread surface.

2. The pneumatic tire of claim 1, wherein a first groove portion groove width Z and a second groove portion groove width of the top of the second groove portion S are set such that a groove width ratio S/Z of the central circumferential direction groove is greater than the groove width ratio S/Z of the others of the circumferential direction grooves.

* * * * *